US009531070B2

(12) United States Patent
Schiller

(10) Patent No.: US 9,531,070 B2
(45) Date of Patent: Dec. 27, 2016

(54) EXTENDING BEAMFORMING CAPABILITY OF A COUPLED VOLTAGE CONTROLLED OSCILLATOR (VCO) ARRAY DURING LOCAL OSCILLATOR (LO) SIGNAL GENERATION THROUGH ACCOMMODATING DIFFERENTIAL COUPLING BETWEEN VCOS THEREOF

(71) Applicant: Christopher T. Schiller, Redding, CA (US)

(72) Inventor: Christopher T. Schiller, Redding, CA (US)

( * ) Notice: Subject to any disclaimer, the term of this patent is extended or adjusted under 35 U.S.C. 154(b) by 299 days.

(21) Appl. No.: 14/215,977

(22) Filed: Mar. 17, 2014

(65) Prior Publication Data

US 2014/0266892 A1 Sep. 18, 2014

Related U.S. Application Data

(63) Continuation-in-part of application No. 14/215,778, filed on Mar. 17, 2014.

(60) Provisional application No. 61/799,436, filed on Mar. 15, 2013.

(51) Int. Cl.
*H04B 7/00* (2006.01)
*H01Q 3/42* (2006.01)

(52) U.S. Cl.
CPC .................................. *H01Q 3/42* (2013.01)

(58) Field of Classification Search
CPC .............. H04B 7/00; H01Q 3/42; H01Q 3/12; G01S 5/02; G01S 3/02
USPC .......................................... 342/367–369, 374
See application file for complete search history.

(56) References Cited

U.S. PATENT DOCUMENTS 2,087,767 A 7/1937 Schermer
2,349,976 A 5/1944 Matsudaira
2,810,906 A 10/1957 Lynch
2,904,674 A 9/1959 Crawford
3,036,211 A 5/1962 Broadhead, Jr. et al.
3,193,767 A 7/1965 Schultz
(Continued)

FOREIGN PATENT DOCUMENTS

CA 2255347 A1 6/1999
CA 2340716 A1 3/2000
(Continued)

OTHER PUBLICATIONS

"An Analysis of Power Consumption in a Smartphone", NICTA, University of New South Wales, 2010 by Aaron Carroll, (pp. 14) https://www.usenix.org/legacy/event/usenix10/tech/full_papers/Carroll.pdf.
(Continued)

*Primary Examiner* — Harry Liu
(74) *Attorney, Agent, or Firm* — Raj Abhyanker, P.C.

(57) ABSTRACT

A method includes implementing a coupled Voltage Controlled Oscillator (VCO) array with a number of VCOs, and mixing Local Oscillator (LO) signals generated through the number of VCOs of the coupled VCO array with signals from antenna elements of an antenna array to introduce differential phase shifts in signal paths coupled to the antenna elements during performing beamforming with the antenna array. The method also includes accommodating differential coupling between the VCOs to improve immunity to noise and/or interference during the beamforming compared to the VCOs accommodating single-ended coupling therebetween.

15 Claims, 6 Drawing Sheets

(56) References Cited

U.S. PATENT DOCUMENTS 3,305,864 A 2/1967 Ghose
3,328,714 A 6/1967 Hugenholtz
3,344,355 A 9/1967 Massman
3,422,436 A 1/1969 Marston
3,422,437 A 1/1969 Marston
3,433,960 A 3/1969 Minott
3,460,145 A 8/1969 Johnson
3,500,411 A 3/1970 Kiesling
3,619,786 A 11/1971 Wilcox
3,680,112 A 7/1972 Thomas
3,754,257 A 8/1973 Coleman
3,803,618 A 4/1974 Coleman
3,838,423 A 9/1974 Di Matteo
3,996,592 A 12/1976 Kline et al.
4,001,691 A 1/1977 Gruenberg
4,017,867 A 4/1977 Claus
4,032,922 A 6/1977 Provencher
4,090,199 A 5/1978 Archer
4,112,430 A 9/1978 Ladstatter
4,148,031 A 4/1979 Fletcher et al.
4,188,578 A 2/1980 Reudink et al.
4,189,733 A 2/1980 Malm
4,214,244 A 7/1980 McKay et al.
4,233,606 A 11/1980 Lovelace et al.
4,270,222 A 5/1981 Menant
4,277,787 A 7/1981 King
4,315,262 A 2/1982 Acampora et al.
4,404,563 A 9/1983 Richardson
4,532,519 A 7/1985 Rudish et al.
4,544,927 A 10/1985 Kurth et al.
4,566,013 A 1/1986 Steinberg et al.
4,649,373 A 3/1987 Bland et al.
4,688,045 A 8/1987 Knudsen
4,698,748 A 10/1987 Juzswik et al.
4,722,083 A 1/1988 Tirro et al.
4,736,463 A 4/1988 Chavez
4,743,783 A 5/1988 Isbell et al.
4,772,893 A 9/1988 Iwasaki
4,792,991 A 12/1988 Eness
4,806,938 A 2/1989 Meadows
4,827,268 A 5/1989 Rosen
4,882,589 A 11/1989 Reisenfeld
4,901,085 A 2/1990 Spring et al.
4,956,643 A 9/1990 Hahn, III et al.
4,965,602 A 10/1990 Kahrilas et al.
5,001,776 A 3/1991 Clark
5,012,254 A 4/1991 Thompson
5,027,126 A 6/1991 Basehgi et al.
5,028,931 A 7/1991 Ward
5,034,752 A 7/1991 Pourailly et al.
5,041,836 A 8/1991 Paschen et al.
5,084,708 A 1/1992 Champeau et al.
5,093,668 A 3/1992 Sreenivas
5,107,273 A 4/1992 Roberts
5,128,687 A 7/1992 Fay
5,166,690 A 11/1992 Carlson et al.
5,173,701 A 12/1992 Dijkstra
5,179,724 A 1/1993 Lindoff
5,243,415 A 9/1993 Vance
5,274,836 A 12/1993 Lux
5,276,449 A 1/1994 Walsh
5,347,546 A 9/1994 Abadi et al.
5,349,688 A 9/1994 Nguyen
5,359,329 A 10/1994 Lewis et al.
5,369,771 A 11/1994 Gettel
5,375,146 A 12/1994 Chalmers
5,396,635 A 3/1995 Fung
5,408,668 A 4/1995 Tornai
5,434,578 A 7/1995 Stehlik
5,457,365 A 10/1995 Blagaila et al.
5,481,570 A 1/1996 Winters
5,486,726 A 1/1996 Kim et al.
5,497,162 A 3/1996 Kaiser
5,523,764 A 6/1996 Martinez et al.
5,539,415 A 7/1996 Metzen et al.
5,560,020 A 9/1996 Nakatani et al.
5,560,024 A 9/1996 Harper et al.
5,564,094 A 10/1996 Anderson et al.
5,583,511 A 12/1996 Hulderman
5,592,178 A 1/1997 Chang et al.
5,594,460 A 1/1997 Eguchi
5,617,572 A 4/1997 Pearce et al.
5,666,365 A 9/1997 Kostreski
5,697,081 A 12/1997 Lyall, Jr. et al.
5,710,929 A 1/1998 Fung
5,712,641 A 1/1998 Casabona et al.
5,748,048 A 5/1998 Moyal
5,754,138 A 5/1998 Turcotte et al.
5,787,294 A 7/1998 Evoy
5,790,070 A 8/1998 Natarajan et al.
5,799,199 A 8/1998 Ito et al.
5,822,597 A 10/1998 Kawano et al.
5,867,063 A 2/1999 Snider et al.
5,869,970 A 2/1999 Palm et al.
5,870,685 A 2/1999 Flynn
5,909,460 A 6/1999 Dent
5,952,965 A 9/1999 Kowalski
5,959,578 A 9/1999 Kreutel, Jr.
5,966,371 A 10/1999 Sherman
5,987,614 A 11/1999 Mitchell et al.
6,006,336 A 12/1999 Watts, Jr. et al.
6,009,124 A 12/1999 Smith et al.
6,026,285 A 2/2000 Lyall, Jr. et al.
6,061,385 A 5/2000 Ostman
6,079,025 A 6/2000 Fung
6,084,540 A 7/2000 Yu
6,111,816 A 8/2000 Chiang et al.
6,127,815 A 10/2000 Wilcox
6,127,971 A 10/2000 Calderbank et al.
6,144,705 A 11/2000 Papadopoulos et al.
6,166,689 A 12/2000 Dickey, Jr. et al.
6,167,286 A 12/2000 Ward et al.
6,169,522 B1 1/2001 Ma et al.
6,175,719 B1 1/2001 Sarraf et al.
6,272,317 B1 8/2001 Houston et al.
6,298,221 B1 10/2001 Nguyen
6,317,411 B1 11/2001 Whinnett et al.
6,320,896 B1 11/2001 Jovanovich et al.
6,336,030 B2 1/2002 Houston et al.
6,397,090 B1 5/2002 Cho
6,463,295 B1 10/2002 Yun
6,473,016 B2 10/2002 Piirainen et al.
6,473,037 B2 10/2002 Vail et al.
6,480,522 B1 11/2002 Hoole et al.
6,501,415 B1 12/2002 Viana et al.
6,509,865 B2 1/2003 Takai
6,523,123 B1 2/2003 Barbee
6,529,162 B2 3/2003 Newberg et al.
6,587,077 B2 7/2003 Vail et al.
6,598,009 B2 7/2003 Yang
6,630,905 B1 10/2003 Newberg et al.
6,646,599 B1 11/2003 Apa et al.
6,653,969 B1 11/2003 Birleson
6,661,366 B2 12/2003 Yu
6,661,375 B2 12/2003 Rickett et al.
6,671,227 B2 12/2003 Gilbert et al.
6,697,953 B1 2/2004 Collins
6,707,419 B2 3/2004 Woodington et al.
6,768,456 B1 7/2004 Lalezari et al.
6,771,220 B1 8/2004 Ashe et al.
6,778,137 B2 8/2004 Krikorian et al.
6,788,250 B2 9/2004 Howell
6,816,977 B2 11/2004 Brakmo et al.
6,822,522 B1 11/2004 Brown et al.
6,833,766 B2 12/2004 Kim et al.
6,870,503 B2 3/2005 Mohamadi
6,873,289 B2 3/2005 Kwon et al.
6,885,974 B2 4/2005 Holle
6,947,775 B2 9/2005 Okamoto et al.
6,960,962 B2 11/2005 Peterzell et al.
6,977,610 B2 12/2005 Brookner et al.
6,980,786 B1 12/2005 Groe
6,989,787 B2 1/2006 Park et al.
6,992,992 B1 1/2006 Cooper et al.

(56) References Cited

U.S. PATENT DOCUMENTS 7,006,039 B2 2/2006 Miyamoto et al.
7,010,330 B1 3/2006 Tsividis
7,013,165 B2 3/2006 Yoon et al.
7,016,654 B1 3/2006 Bugeja
7,035,613 B2 4/2006 Dubash et al.
7,039,442 B1 5/2006 Joham et al.
7,062,302 B2 6/2006 Yamaoka
7,103,383 B2 9/2006 Ito
7,109,918 B1 9/2006 Meadows et al.
7,109,919 B2 9/2006 Howell
7,110,732 B2 9/2006 Mostafa et al.
7,126,542 B2 10/2006 Mohamadi
7,126,554 B2 10/2006 Mohamadi
7,154,346 B2 12/2006 Jaffe et al.
7,196,590 B1 3/2007 In et al.
7,245,269 B2 7/2007 Sievenpiper et al.
7,304,607 B2 12/2007 Miyamoto et al.
7,312,750 B2 12/2007 Mao et al.
7,327,313 B2 2/2008 Hemmi et al.
7,340,623 B2 3/2008 Kato et al.
7,379,515 B2 5/2008 Johnson et al.
7,382,202 B2 6/2008 Jaffe et al.
7,382,314 B2 6/2008 Liao et al.
7,382,743 B1 6/2008 Rao et al.
7,421,591 B2 9/2008 Sultenfuss et al.
7,440,766 B1 10/2008 Tuovinen et al.
7,463,191 B2 12/2008 Dybdal et al.
7,482,975 B2 1/2009 Kimata
7,501,959 B2 3/2009 Shirakawa
7,508,950 B2 3/2009 Danielsen
7,522,885 B2 4/2009 Parssinen et al.
7,529,443 B2 5/2009 Holmstrom et al.
7,558,548 B2 7/2009 Konchistky
7,570,124 B2 8/2009 Haralabidis et al.
7,574,617 B2 8/2009 Park
7,620,382 B2 11/2009 Yamamoto
7,663,546 B1 2/2010 Miyamoto et al.
7,664,533 B2 2/2010 Logothetis et al.
7,710,319 B2 5/2010 Nassiri-Toussi et al.
7,728,769 B2 6/2010 Chang et al.
7,742,000 B2 6/2010 Mohamadi
7,760,122 B1 7/2010 Zortea
7,812,775 B2 10/2010 Babakhani et al.
7,848,719 B2 12/2010 Krishnaswamy et al.
7,861,098 B2 12/2010 Theocharous et al.
7,912,517 B2 3/2011 Park
7,925,208 B2 4/2011 Sarraf et al.
7,934,107 B2 4/2011 Walrath
7,944,396 B2 5/2011 Brown et al.
7,979,049 B2 7/2011 Oredsson et al.
7,982,651 B1 7/2011 Zortea
7,982,669 B2 7/2011 Nassiri-Toussi et al.
7,991,437 B2 8/2011 Camuffo et al.
8,005,437 B2 8/2011 Rofougaran
8,031,019 B2 10/2011 Chawla et al.
8,036,164 B1 10/2011 Winters et al.
8,036,719 B2 10/2011 Ying
8,063,996 B2 11/2011 Du Val et al.
8,072,380 B2 12/2011 Crouch
8,078,110 B2 12/2011 Li et al.
8,102,313 B2 1/2012 Guenther et al.
8,112,646 B2 2/2012 Tsai
8,126,417 B2 2/2012 Saito
8,138,841 B2 3/2012 Wan et al.
8,156,353 B2 4/2012 Tsai
8,165,185 B2 4/2012 Zhang et al.
8,165,543 B2 4/2012 Rohit et al.
8,170,503 B2 5/2012 Oh et al.
8,174,328 B2 5/2012 Park et al.
8,184,052 B1 5/2012 Wu et al.
8,222,933 B2 7/2012 Nagaraj
8,248,203 B2 8/2012 Hanwright et al.
8,265,646 B2 9/2012 Agarwal
8,290,020 B2 10/2012 Liu et al.
8,305,190 B2 11/2012 Moshfeghi
8,325,089 B2 12/2012 Rofougaran
8,340,015 B1 12/2012 Miller et al.
8,344,943 B2 1/2013 Brown et al.
8,373,510 B2 2/2013 Kelkar
8,396,107 B2 3/2013 Gaur
8,400,356 B2 3/2013 Paynter
8,417,191 B2 4/2013 Xia et al.
8,428,535 B1 4/2013 Cousinard et al.
8,432,805 B2 4/2013 Agarwal
8,446,317 B1 5/2013 Wu et al.
8,456,244 B2 6/2013 Obkircher et al.
8,466,776 B2 6/2013 Fink et al.
8,466,832 B2 6/2013 Afshari et al.
8,472,884 B2 6/2013 Ginsburg et al.
8,509,144 B2 8/2013 Miller et al.
8,542,629 B2 9/2013 Miller
8,558,625 B1 10/2013 Lie et al.
8,565,358 B2 10/2013 Komaili et al.
8,571,127 B2 10/2013 Jiang et al.
8,604,976 B1 12/2013 Chang et al.
8,644,780 B2 2/2014 Tohoku
8,654,262 B2 2/2014 Du Val et al.
8,660,497 B1 2/2014 Zhang et al.
8,660,500 B2 2/2014 Rofougaran et al.
8,700,923 B2 4/2014 Fung
8,761,755 B2 6/2014 Karaoguz
8,762,751 B2 6/2014 Rodriguez et al.
8,781,426 B2 7/2014 Ciccarelli et al.
8,786,376 B2 7/2014 Voinigescu et al.
8,788,103 B2 7/2014 Warren
8,792,896 B2 7/2014 Ahmad et al.
8,797,212 B1 8/2014 Wu et al.
8,805,275 B2 8/2014 O'Neill et al.
8,832,468 B2 9/2014 Pop et al.
8,843,094 B2 9/2014 Ahmed et al.
2001/0038318 A1 11/2001 Johnson et al.
2002/0084934 A1 7/2002 Vail et al.
2002/0159403 A1 10/2002 Reddy
2002/0175859 A1 11/2002 Newberg et al.
2002/0177475 A1 11/2002 Park
2002/0180639 A1 12/2002 Rickett et al.
2003/0003887 A1 1/2003 Lim et al.
2003/0034916 A1 2/2003 Kwon et al.
2004/0043745 A1 3/2004 Najarian et al.
2004/0095256 A1* 5/2004 Mohamadi ............. G08C 17/02 340/870.18
2004/0095287 A1 5/2004 Mohamadi
2004/0166801 A1 8/2004 Sharon et al.
2004/0192376 A1 9/2004 Grybos
2004/0263408 A1 12/2004 Sievenpiper et al.
2005/0012667 A1 1/2005 Noujeim
2005/0030226 A1 2/2005 Miyamoto et al.
2005/0064840 A1* 3/2005 Heydari ............... H03D 7/1441 455/323
2005/0116864 A1 6/2005 Mohamadi
2005/0117720 A1 6/2005 Goodman et al.
2005/0197060 A1 9/2005 Hedinger et al.
2005/0206564 A1 9/2005 Mao et al.
2005/0208919 A1 9/2005 Walker et al.
2005/0215274 A1 9/2005 Matson et al.
2006/0003722 A1 1/2006 Tuttle et al.
2006/0063490 A1 3/2006 Bader et al.
2006/0262013 A1 11/2006 Shiroma et al.
2006/0281430 A1 12/2006 Yamamoto
2007/0047669 A1 3/2007 Mak et al.
2007/0098320 A1 5/2007 Holmstrom et al.
2007/0099588 A1 5/2007 Konchistky
2007/0123186 A1 5/2007 Asayama et al.
2007/0135051 A1 6/2007 Zheng et al.
2007/0142089 A1 6/2007 Roy
2007/0173286 A1 7/2007 Carter et al.
2007/0298742 A1 12/2007 Ketchum et al.
2008/0001812 A1 1/2008 Jalali
2008/0039042 A1 2/2008 Ciccarelli et al.
2008/0045153 A1 2/2008 Surineni et al.
2008/0063012 A1 3/2008 Nakao et al.
2008/0075058 A1 3/2008 Mundarath et al.
2008/0091965 A1 4/2008 Nychka et al.
2008/0129393 A1 6/2008 Rangan et al.

(56) References Cited

U.S. PATENT DOCUMENTS

| | | | |
|---|---|---|---|
| 2008/0218429 | A1 | 9/2008 | Johnson et al. |
| 2008/0233865 | A1 | 9/2008 | Malarky et al. |
| 2008/0240031 | A1 | 10/2008 | Nassiri-Toussi et al. |
| 2009/0023384 | A1 | 1/2009 | Miller |
| 2009/0115650 | A1* | 5/2009 | Tietjen ................. H04B 7/0617 341/141 |
| 2009/0143038 | A1 | 6/2009 | Saito |
| 2009/0153253 | A1 | 6/2009 | Mei |
| 2009/0160707 | A1 | 6/2009 | Lakkis |
| 2009/0286482 | A1 | 11/2009 | Gorokhov et al. |
| 2010/0100751 | A1 | 4/2010 | Guo et al. |
| 2010/0259447 | A1 | 10/2010 | Crouch |
| 2010/0302980 | A1 | 12/2010 | Ji et al. |
| 2011/0084879 | A1 | 4/2011 | Brown et al. |
| 2011/0095794 | A1 | 4/2011 | Dubost et al. |
| 2011/0140746 | A1 | 6/2011 | Park et al. |
| 2011/0188597 | A1 | 8/2011 | Agee et al. |
| 2011/0221396 | A1 | 9/2011 | Glauning |
| 2011/0235748 | A1 | 9/2011 | Kenington |
| 2011/0273210 | A1 | 11/2011 | Nagaraj |
| 2011/0285593 | A1 | 11/2011 | Cavirani et al. |
| 2011/0298521 | A1* | 12/2011 | Ru ........................... H03D 7/14 327/356 |
| 2012/0004005 | A1 | 1/2012 | Ahmed et al. |
| 2012/0013507 | A1 | 1/2012 | Fusco |
| 2012/0026970 | A1 | 2/2012 | Winters et al. |
| 2012/0092211 | A1 | 4/2012 | Hampel et al. |
| 2012/0190378 | A1 | 7/2012 | Han et al. |
| 2012/0200327 | A1 | 8/2012 | Sreekiran et al. |
| 2012/0235716 | A1 | 9/2012 | Dubost et al. |
| 2012/0235857 | A1 | 9/2012 | Kim et al. |
| 2012/0268177 | A1* | 10/2012 | Hogeboom ............. H03L 7/099 327/156 |
| 2012/0280730 | A1 | 11/2012 | Obkircher et al. |
| 2012/0284543 | A1 | 11/2012 | Xian et al. |
| 2012/0319734 | A1 | 12/2012 | Nagaraj et al. |
| 2013/0002472 | A1 | 1/2013 | Crouch |
| 2013/0039348 | A1 | 2/2013 | Hu et al. |
| 2013/0047017 | A1 | 2/2013 | Lin et al. |
| 2013/0095873 | A1 | 4/2013 | Soriaga et al. |
| 2013/0154695 | A1 | 6/2013 | Abbasi et al. |
| 2013/0176171 | A1 | 7/2013 | Webber et al. |
| 2013/0234889 | A1 | 9/2013 | Hwang et al. |
| 2013/0241612 | A1 | 9/2013 | Obkircher et al. |
| 2013/0322197 | A1 | 12/2013 | Schiller et al. |
| 2013/0339764 | A1 | 12/2013 | Lee et al. |
| 2014/0085011 | A1 | 3/2014 | Choi et al. |
| 2014/0097986 | A1 | 4/2014 | Xue et al. |
| 2014/0120845 | A1 | 5/2014 | Laskar |
| 2014/0120848 | A1 | 5/2014 | Laskar |
| 2014/0266471 | A1 | 9/2014 | Zhu et al. |
| 2014/0266889 | A1 | 9/2014 | Schiller |
| 2014/0266890 | A1 | 9/2014 | Schiller et al. |
| 2014/0266891 | A1 | 9/2014 | Schiller et al. |
| 2014/0266892 | A1 | 9/2014 | Schiller |
| 2014/0266893 | A1 | 9/2014 | Rasheed et al. |
| 2014/0266894 | A1 | 9/2014 | Rasheed et al. |
| 2014/0273817 | A1 | 9/2014 | Schiller |

FOREIGN PATENT DOCUMENTS

| | | | |
|---|---|---|---|
| EP | 0305099 | A2 | 3/1989 |
| EP | 0754355 | B1 | 6/2000 |
| EP | 1047216 | A2 | 10/2000 |
| EP | 1261064 | A1 | 11/2002 |
| EP | 1267444 | A2 | 12/2002 |
| EP | 1672468 | A2 | 6/2006 |
| EP | 2003799 | A1 | 12/2008 |
| EP | 2151924 | A1 | 2/2010 |
| EP | 2456079 | A2 | 5/2012 |
| WO | 8601057 | A1 | 2/1986 |
| WO | 8706072 | A1 | 10/1987 |
| WO | 9107024 | A1 | 5/1991 |
| WO | 9414178 | A1 | 6/1994 |
| WO | 9721284 | A1 | 6/1997 |
| WO | 9832245 | A1 | 7/1998 |
| WO | 9916221 | A1 | 4/1999 |
| WO | 0051202 | A1 | 8/2000 |
| WO | 0055986 | A1 | 9/2000 |
| WO | 0074170 | A2 | 12/2000 |
| WO | 0117065 | A1 | 3/2001 |
| WO | 0198839 | A2 | 12/2001 |
| WO | 03023438 | A2 | 3/2003 |
| WO | 03038513 | A2 | 5/2003 |
| WO | 03041283 | A2 | 5/2003 |
| WO | 03079043 | A2 | 9/2003 |
| WO | 2004021541 | A1 | 3/2004 |
| WO | 2004082197 | A2 | 9/2004 |
| WO | 2006133225 | A2 | 12/2006 |
| WO | 2007130442 | A2 | 11/2007 |
| WO | 2010024539 | A2 | 3/2010 |
| WO | 2010073241 | A2 | 7/2010 |
| WO | 2011008146 | A1 | 1/2011 |
| WO | 2012033509 | A1 | 3/2012 |
| WO | 2014057329 | A2 | 4/2014 |
| WO | 2014150615 | A1 | 9/2014 |
| WO | 2014151933 | A2 | 9/2014 |

OTHER PUBLICATIONS

"Standby Consumption in Households State of the Art and Possibilities for Reduction for Home Electronics", Delft, The Netherlands (pp. 8) http://standby.lbl.gov/pdf/siderius.html.

"Wake on Wireless: An Event Driven Energy Saving Strategy for Battery Operated Devices", Massachusetts Institute of Technology Cambridge, 2002 by Eugene Shih et al. (pp. 12) http://research.microsoft.com/en-us/um/people/bahl/Papers/Pdf/mobicom02.pdf.

"Reducing Leaking Electricity to 1 Watt" National Laboratory, Berkeley, CA, Aug. 28, 1998 by Alan Meier et al. (pp. 10) http://standby.lbl.gov/pdf/42108.html.

"Monitoring in Industrial Systems Using Wireless Sensor Network With Dynamic Power Management", Dept. of Technol., Univ. Regional do Noroeste do Estado do Rio Grande do Sul (UNIJUI), Ijui, Brazil, Jul. 21, 2009 by F. Salvadori (p. 2) http://ieeexplore.ieee.org/xpl/login.jsp?tp=&arnumber=5169976 &url=http%3A%2F%2Fieeexplore.ieee.org%2Fxpls%.

"Reducing Power in High-performance Microprocessors", Intel Corporation,Santa Clara CA. 1998 by Vivek Tiwari et al. (p. 1) http://dl.acm.org/citation.cfm?id=277227.

"Simulating the Power Consumption of Large-Scale Sensor Network Applications", Division of Engineering and Applied Sciences,Harvard University, by Victor Shnayder et al. (pp. 13) http://web.stanford.edu/class/cs344a/papers/sensys04ptossim.pdf.

"Distributed Transmit Beamforming:Challenges and Recent Progress", University of California at Santa Barbara, 2009 by Raghuraman Mudumbai et al. (pp. 9) http://spinlab.wpi.edu/pubs/Mudumbai_COMMAG_2009.pdf.

"Design and Simulation of a Low Cost Digital Beamforming (DBF) Receiver for Wireless Communication",International Journal of Innovative Technology and Exploring Engineering (IJITEE), vol. 2, Jan. 2, 2013 by V.N. Okorogu (pp. 8) http://www.ijitee.org/attachments/File/v2i2/B0351012213.pdf.

"Frequency multiplication techniques for Sub-harmonic injection locking of LC oscillators and Its application to phased-array architectures", Ottawa-Carleton Institute for Electrical and Computer Engineering, 2013 by Yasser Khairat Soliman (pp. 2) https://curve.carleton.ca/system/files/theses/27532.pdf.

"Active Integrated Antennas", Transactions on microwave theory and techniques, vol. No. 50, No. 3, Mar. 2002, by Kai Chang et al. (pp. 8) http://www.cco.caltech.edu/~mmic/reshpubindex/MURI/MURI03/York2.pdf.

"Low cost and compact active integrated antenna transceiver for system applications", Dept. of Electronics Engineers, Texas A&M University, College Station, Texas, USA, Oct. 1996 by R.A. Flynt et al. (p. 1) http://ieeexplore.ieee.org/xpl/login.jsp?tp=&arnumber=538955&url=http%3A%2F%2Fieeexplore.ieee.org%2Fxpls%2Fabs_all.jsp%3Farnumber%3D538955.

(56) References Cited

OTHER PUBLICATIONS

"Phased array and adaptive antenna transceivers in wireless sensor networks", Institute of Microsystem Technology—IMTEK, Albert-Ludwig-University, Freiburg, Germany, 2004 by Ruimin Huang et al. (pp. 1) http://ieeexplore.ieee.org/xpl/login.jsp?tp=&arnumber=1333329&url=http%3A%2F%2Fieeexplore.ieee.org%2Fxpls%2Fabs_all.jsp%3Farnumber%3D1333329.

"A mixed-signal sensor interface microinstrument", Sensors and Actuators A: Physical, Science Direct, vol. 91, Issue 3, Jul. 15, 2001 by Keith L. Kraver et al. (p. 2) http://www.sciencedirect.com/science/article/pii/S0924424701005969.

"On the Feasibility of Distributed Beamforming in Wireless Networks", IEEE transactions on wireless communications, vol. 6,No. 5, May 2007 by R. Mudumbai. (pp. 10) https://research.engineering.uiowa.edu/wrl/sites/research.engineering.uiowa.edu.wrl/files/attachments/TWICOM07_0.pdf.

"Antenna Systems for Radar Applications Information Technology Essay", (pp. 15) http://www.ukessays.com/essays/information-technology/antenna-systems-for-radar-applications-information-technology-essay.php.

"Smart antennas control circuits for automotive communications", Mar. 28, 2012, by David Cordeau et al. (pp. 10) https://hal.archives-ouvertes.fr/file/index/docid/683344/filename/Cordeau_Paillot.pdf.

"Adaptive Beam Steering of RLSA Antenna With RFID Technonlogy", Progress in Electromagnetics Research, vol. 108, Jul. 19, 2010 by M. F. Jamlos et al. (pp. 16) http://jpier.org/PIER/pier108/05.10071903.pdf.

"Adaptive power controllable retrodirective array system for wireless sensor server applications", IEEE Xplore, Deptartment of Electrical Engineering, University of California, Los Angeles, CA, USA Dec. 2005, by Lim et al. (p. 1) ieeexplore.ieee.org/xpl/login.jsp?tp=&arnumber=1550023&url=http%3A%2F%2Fieeexplore.ieee.org%2Fxpls%.

"Retrodirective arrays for wireless communications", Microwave Magzine, IEEE Xplore, vol. 3,Issue 1, Mar. 2002 by R.Y. Miyamoto et al. (p. 1) http://ieeexplore.ieee.org/xpl/login.jsp?tp=&arnumber=990692&url=http%3A%2F%2Fieeexplore.ieee.org%2Fxpls%2Fabs_all.jsp%3Farnumber%3D990692.

"An Active Integrated Retrodirective Transponder for Remote Information Retrieval-on-Demand", IEEE Transactions on Microwave Theory and Techniques, vol. 49, No. 9, Sep. 2001 by Ryan Y. Miyamoto et al. (pp. 5) http://www.mwlab.ee.ucla.edu/publications/2001c/mtt_trans/d.pdf.

"Ongoing retro directive Array Research at UCLA", The Institute of electrical Information and communication Engineers, by Kevin M.K.H. Leong et al. (pp. 6). http://www.ieice.org/~wpt/paper.SPS02-08.pdf.

"Digital communications using self-phased arrays", Jet Propulsion Lab., California Inst. of Technology, Pasadena, CA, USA, IEEE Xplore, vol. 49, Issue 4, Apr. 2001 by L.D. DiDomenico et al. (p. 1) http://ieeexplore.ieee.org/xpl/login.jsp?tp=&arnumber=915442&url=http%3A%2F%2Fieeexplore.ieee.org%2Fxpls%2Fabs_all.jsp%3Farnumber%3D915442.

"Large Active Retrodirective Arrays for Space Applications", NASA Technical Documents, Jan. 15, 1978 by R. C Chernoff (p. 1) https://archive.org/details/nasa_techdoc_19780013390.

"Beam Steering in Smart Antennas by Using Low Complex Adaptive Algorithms", International Journal of Research in Engineering and Technology, vol. 02 Issue: 10, Oct. 2013 by Amarnadh Poluri et al. (pp. 7) http://ijret.org/Volumes/V02/I10/IJRET_110210085.pdf.

"Efficient Adaptive Beam Steering Using INLMS Algorithm for Smart Antenna", ECE Department, QIS College of Engineering and Technology, Ongole, India, Jul. 22, 2012 by E. Anji Naik et al. (pp. 5) http://www.irnetexplore.ac.In/IRNetExplore_Proceedings/Vijayawada/AEEE/AEEE_22ndJuly2012/AEEE_22ndJuly2012_doc/paper3.pdf.

"A Primer on Digital Beamforming", Mar. 26, 1998 by Toby Haynes (pp. 15) http://www.spectrumsignal.com/publications/beamform_primer.pdf.

"Design of Beam Steering Antenna Array for RFID Reader Using Fully Controlled RF Switches", Mobile and Satellite Communications Research Centre University of Bradfor by D. Zhou et al. (pp. 7).

"Electronically steerable passive array radiator antennas for low-cost analog adaptive beamforming", ATR Adaptive Commun. Res. Labs., Kyoto, Japan, IEEE Xplore, 2000 by T. Ohira et al. (p. 1) http://ieeexplore.ieee.org/xpl/articleDetails.jsp?tp=&arnumber=858918&url=http%3A%2F%2Fieeexplore.ieee.org%2Fxpls%2Fabs_all.jsp%3Farnumber%3D858918.

"Sector-mode beamforming of a 2.4GHz electronically steerable passive array radiator antenna for a wireless ad hoc network", ATR Adaptive Commun. Res. Labs., Kyoto, Japan, IEEE Xplore, 2002 by Jun. Cheng et al. (Page 1) http://ieeexplore.ieee.org/xpl/articleDetails.jsp?arnumber=1016265.

"Design of electronically steerable passive array radiator (ESPAR) antennas", ATR Adaptive Commun. Res. Lab., Kyoto, Japan, IEEE Xplore, 2000 by K. Gyoda et al. (p. 1) http://ieeexplore.ieee.org/xpl/articleDetails.jsp?arnumber=875370.

"An adaptive MAC protocol for wireless ad hoc community network (WACNet) using electronically steerable passive array radiator antenna", ATR Adaptive Commun. Res. Lab., Kyoto, Japan, IEEE Xplore, 2001 by S. Bandyopadhyay et al. (p. 1) http://ieeexplore.ieee.org/xpl/login.jsp?tp=&arnumber=965958&url=http%3A%2F%2Fieeexplore.ieee.org%2Fxpls%.

"A low complex adaptive algorithm for antenna beam steering", Dept. of Electron. & Communication Engineering, Narasaraopeta Eng. Collage, Narasaraopeta, India , IEEE Xplore, 2011 by M.Z.U. Rahman et al. (p. 1) http://ieeexplore.ieee.org/xpl/login.jsp?tp=&arnumber=6024567&url=http%3A%2F%2Fieeexplore.ieee.org%2Fxpls%2Fabs_all.jsp%3Farnumber%3D6024567.

"Receiver Front-End Architectures—Analysis and Evaluation", Mar. 1, 2010 by Pedro Cruz et al. (pp. 27) http://cdn.intechopen.com/pdfs-wm/9961.pdf.

"Analysis and design of injection-locked LC dividers for quadrature generation", Dipt. di Ingegneria dellinformazione, University di Modena e Reggio Emilia, Italy, Solid-State Circuits, IEEE Xplore, vol. 39, Issue 9, Sep. 2004 by A. Mazzanti, et al. (p. 1) http://ieeexplore.ieee.org/xpl/login.jsp?tp=&arnumber=1327739&url=http%3A%2F%2Fieeexplore.ieee.org%2Fxpls%.

"An injection-locking scheme for precision quadrature generation", CeLight Inc., Iselin, NJ, USA Solid-State Circuits, IEEE Xplore, vol. 37, Issue 7, Jul. 2002 by P. Kinget et al. (p. 1) http://ieeexplore.ieee.org/xpl/login.jsp?tp=&arnumber=1015681&url=http%3A%2F%2Fieeexplore.ieee.org%2Fxpls%2Fabs_all.jsp%3Farnumber%3D1015681.

"The Fundamentals of Signal Generation", Agilent Technologies, Electronic Design, Jan. 24, 2013 by Erik Diez (pp. 12) http://electronicdesign.com/test-amp-measurement/fundamentals-signal-generation.

"Microwave CMOS Beamforming Transmitters", Lund Institute of Technology, Nov. 2008 by Johan Wernehag (pp. 234) http://lup.lub.lu.se/luur/download?func=downloadFile&recordOld=1265511&fileOld=1265527.

"A new beam-scanning technique by controlling the coupling angle in a coupled oscillator array", Dept. of Electr. Eng., Korea Adv. Inst. of Sci. & Technol., Seoul, South Korea, IEEE Xplore, vol. 8, Issue 5, May 1998 by Jae-Ho Hwang et al. (p. 1) http://ieeexplore.ieee.org/xpl/login.jsp?tp=&arnumber=668707&url=http%3A%2F%2Fieeexplore.ieee.org%2Fxpls%.

* cited by examiner

EXTENDING BEAMFORMING CAPABILITY OF A COUPLED VOLTAGE CONTROLLED OSCILLATOR (VCO) ARRAY DURING LOCAL OSCILLATOR (LO) SIGNAL GENERATION THROUGH ACCOMMODATING DIFFERENTIAL COUPLING BETWEEN VCOS THEREOF

CLAIM OF PRIORITY

This application is a conversion application of U.S. provisional application no. 61/799,436 titled "EXTENDING BEAM-FORMING CAPABILITY OF COUPLED VOLTAGE CONTROLLED OSCILLATOR (VCO) ARRAYS DURING LOCAL OSCILLATOR (LO) SIGNAL GENERATION THROUGH UTILIZATION OF DIFFERENTIAL CIRCUITRY" filed on Mar. 15, 2013 and a Continuation-In-Part application of U.S. non-provisional application Ser. No. 14/215,778 titled "PHASE SHIFT BASED IMPROVED REFERENCE INPUT FREQUENCY SIGNAL INJECTION INTO A COUPLED VOLTAGE CONTROLLED OSCILLATOR (VCO) ARRAY DURING LOCAL OSCILLATOR (LO) SIGNAL GENERATION TO REDUCE A PHASE-STEERING REQUIREMENT DURING BEAMFORMING" filed on Mar. 17, 2014.

FIELD OF TECHNOLOGY

This disclosure generally relates to beamforming and, more specifically, to a method, a circuit and/or a system of extending beamforming capability of a coupled Voltage Controlled Oscillator (VCO) array during Local Oscillator (LO) signal generation through accommodating differential coupling between VCOs thereof.

BACKGROUND

A coupled Voltage Controlled Oscillator (VCO) array may be employed during Local Oscillator (LO) signal generation in a receiver (e.g., a wireless receiver) to generate differential phase shifts. The coupled VCO array may require an external reference signal injected therein to control an operating frequency thereof. Injection locking between the individual VCOs that are part of the coupled VCO array and between the VCOs and the external reference signal may limit the differential phase shift generation to a certain level, beyond which the injection locking breaks down. The phase difference between the VCOs may then become indeterminable.

SUMMARY

Disclosed are a method, a circuit and/or a system of extending beamforming capability of a coupled Voltage Controlled Oscillator (VCO) array during Local Oscillator (LO) signal generation through accommodating differential coupling between VCOs thereof.

In one aspect, a method includes implementing a coupled VCO array with a number of VCOs, and mixing LO signals generated through the number of VCOs of the coupled VCO array with signals from antenna elements of an antenna array to introduce differential phase shifts in signal paths coupled to the antenna elements during performing beamforming with the antenna array. The method also includes accommodating differential coupling between the VCOs to improve immunity to noise and/or interference during the beamforming compared to the VCOs accommodating single-ended coupling therebetween.

In another aspect, a beamforming system includes a coupled VCO array including a number of VCOs coupled to one another, an antenna array including a number of antenna elements, and a number of mixers. Each of the number of mixers is configured to mix an LO signal generated through a VCO of the coupled VCO array with a signal from an antenna element of the antenna array to introduce differential phase shifts in signal paths coupled to the antenna elements during performing beamforming with the antenna array. The VCOs are configured to accommodate differential coupling therebetween to improve immunity to noise and/or interference during the beamforming compared to the VCOs accommodating single-ended coupling therebetween.

In yet another aspect, a wireless communication system includes a beamforming system. The beamforming system includes a coupled VCO array including a number of VCOs coupled to one another, an antenna array including a number of antenna elements, and a number of mixers. Each of the number of mixers is configured to mix an LO signal generated through a VCO of the coupled VCO array with a signal from an antenna element of the antenna array to introduce differential phase shifts in signal paths coupled to the antenna elements during performing beamforming with the antenna array. The VCOs are configured to accommodate differential coupling therebetween to improve immunity to noise and/or interference during the beamforming compared to the VCOs accommodating single-ended coupling therebetween.

The wireless communication system also includes a receiver channel configured to receive a combined output of the number of mixers of the beamforming system.

Other features will be apparent from the accompanying drawings and from the detailed description that follows.

BRIEF DESCRIPTION OF THE FIGURES

Example embodiments are illustrated by way of example and not limitation in the figures of the accompanying drawings, in which like references indicate similar elements and in which.

Other features of the present embodiments will be apparent from the accompanying drawings and from the disclosure that follows.

DETAILED DESCRIPTION

Example embodiments, as described below, may be used to provide a method, a circuit and/or a system of extending beamforming capability of a coupled Voltage Controlled Oscillator (VCO) array during Local Oscillator (LO) signal generation through accommodating differential coupling between VCOs thereof. Although the present embodiments have been described with reference to specific example embodiments, it will be evident that various modifications and changes may be made to these embodiments without departing from the broader spirit and scope of the various embodiments.

Figure 1:
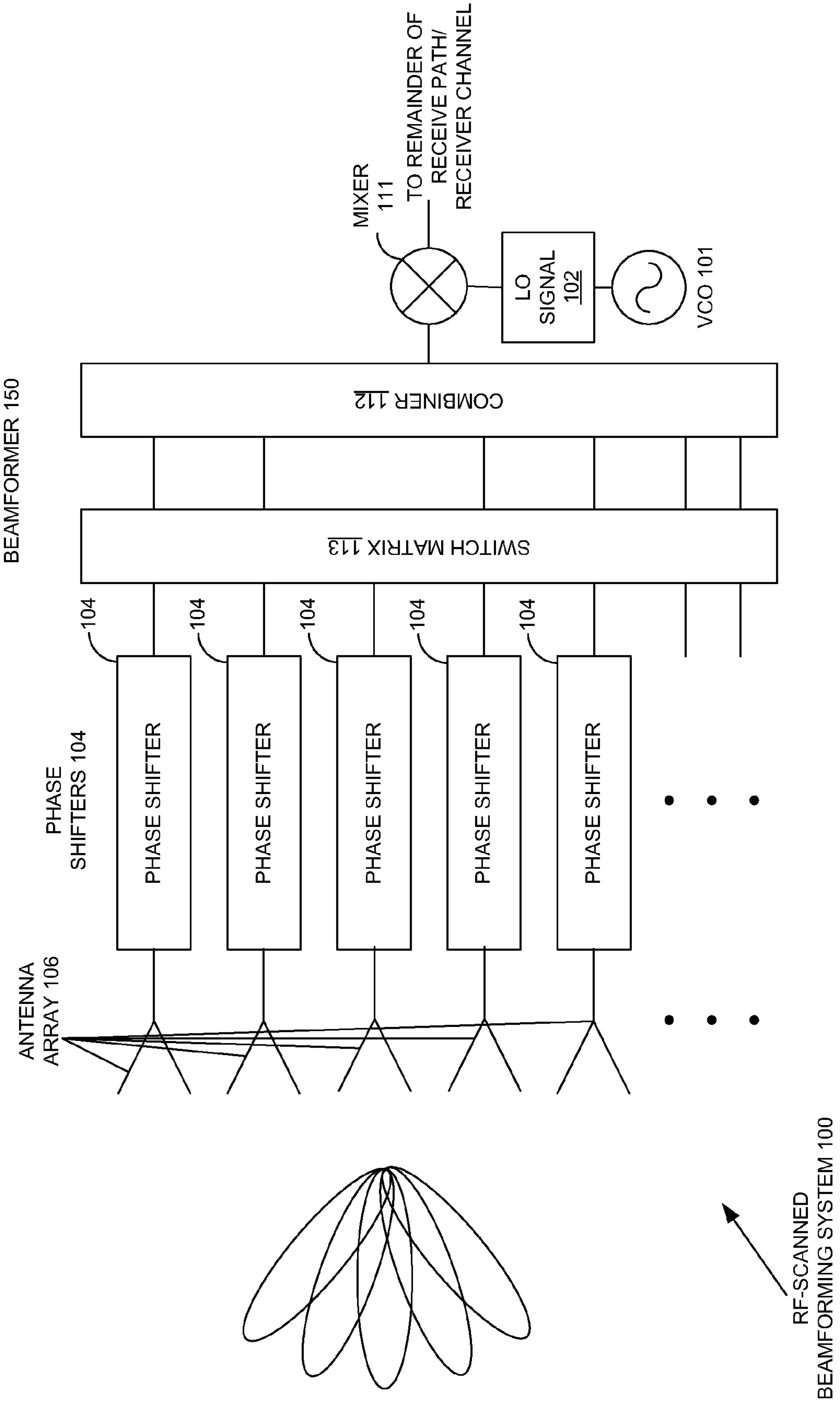
FIG. 1 is a schematic view of a Radio Frequency (RF)-scanned beamforming system.

FIG. 1 shows a Radio Frequency (RF)-scanned beamforming system 100, according to one or more embodiments. Beamforming may be a processing technique for electronically pointing fixed arrays of antenna apertures during wireless transmission and/or reception. For example, beamforming may be used to create a focused antenna beam by shifting a signal in time or in phase to provide gain of the signal in a desired direction and to attenuate the signal in other directions. Here, the arrays may be one-dimensional, two-dimensional, or three-dimensional, and the electronic pointing of an antenna array may be performed for transmission and/or reception of signals. Beamforming may be utilized to direct the energy of a signal transmitted from an antenna array and/or to concentrate the energy of a received signal into an antenna array. Electronically pointing an antenna array may be faster and more flexible than physically pointing a directional antenna.

By directing the energy from and/or concentrating the energy incoming to an antenna array, higher efficiency may be achieved when compared to implementations utilizing a standard antenna. This may result in a capability to transmit and/or receive signals correspondingly to and/or from more distant receiving and/or transmitting radios.

Figure 2:
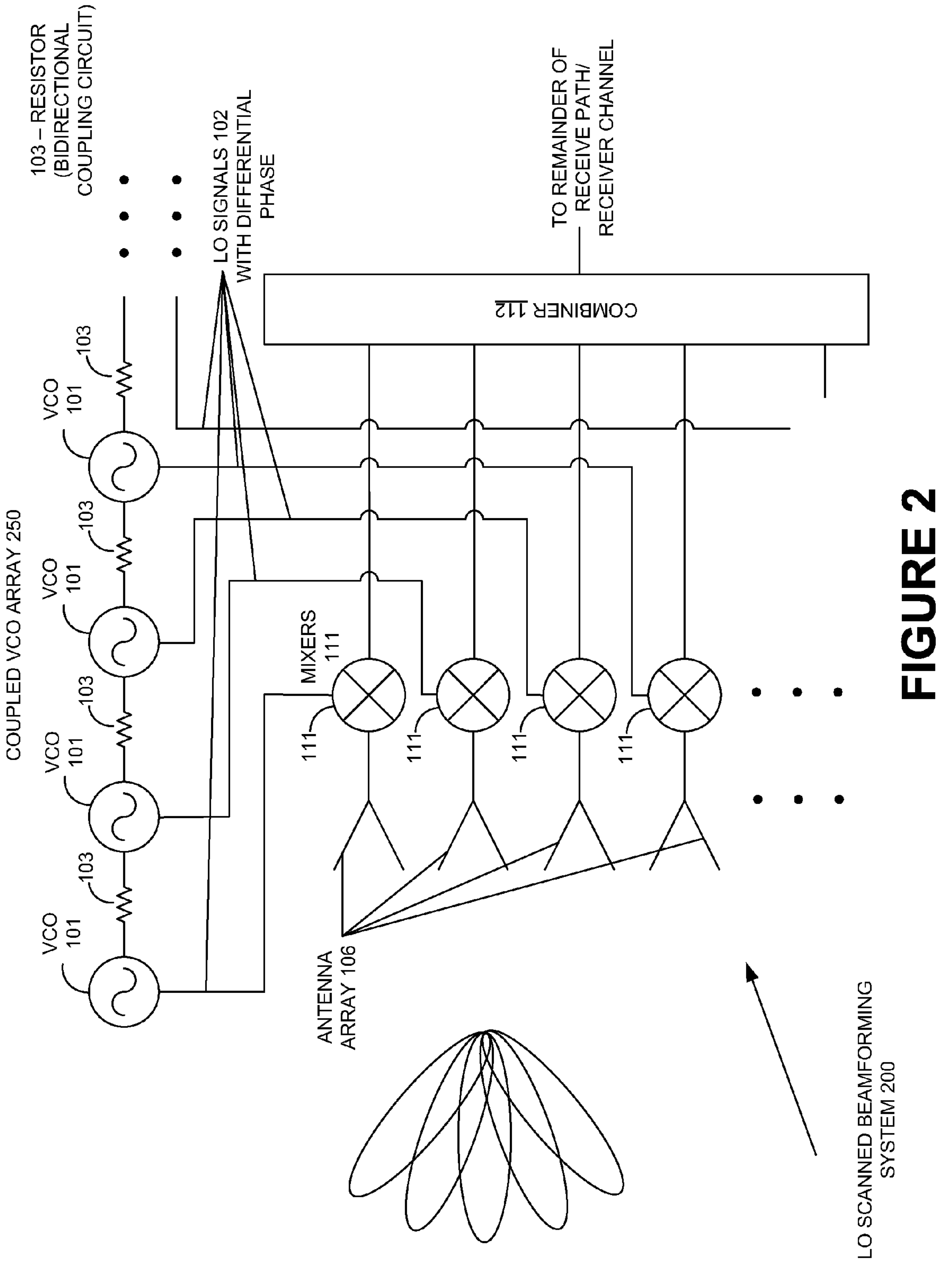
FIG. 2 is a schematic view of a Local Oscillator (LO) scanned beamforming system.

Beamforming may be commonly accomplished by introducing differential phase shifts in the signal paths connected to each of the antenna apertures (antenna elements). One conventional technique, shown in FIG. 1 (e.g., an example beamforming system such as RF-scanned beamforming system 100), may introduce the required phase shifts in the signal paths by using an RF-scanned array (e.g., including antenna array 106), in which explicit phase shifters 104 are connected directly in series with the signal paths (e.g., signal paths from antenna array 106). As shown in FIG. 2 (another example beamforming system), another conventional technique may introduce the required phase shifts in the signal paths by using a Local Oscillator (LO)-scanned array, in which LO signals 102 with differential phases are generated and the differential phase LO signals 102 input to mixers 111 (see also FIG. 1) located in the signal paths (e.g., signal paths coupled to antenna array 106).

Antenna array 106 may be utilized in beam-steering or directing and/or focusing of transmitted/received signals. By directing the energy from and/or concentrating the energy incoming thereto, a higher efficiency may be achieved compared to a standard antenna implementation. This may result in the capability to transmit and/or receive signals corresponding to and/or from more distant receiving or transmitting radios, as discussed above.

A voltage controlled oscillator (VCO) 101 (see FIGS. 1-5) may be an electronic oscillator configured to vary oscillation frequency thereof based on a voltage input. FIGS. 1-5 serve to describe the receiver (e.g., wireless receiver) context in which exemplary embodiments discussed herein may be practiced. The function of VCO 101 in LO signal generation (e.g., LO signal(s) 102 of FIGS. 1-2) as applied to receivers is well known to one of ordinary skill in the art. In order to generate differential phase LO signals, a coupled VCO array may be utilized. FIG. 2 shows an LO scanned beamforming system 200 including a coupled VCO array 250. Here, coupled VCO array 250 may include two or more VCOs 101 mutually injection locked to each other. Injection locking may be the state in which the two or more VCOs 101 exchange oscillatory energy sufficient enough to lock to a same frequency. Injection locking may be accomplished based on coupling VCOs 101 together through a bidirectional coupling circuit (e.g., resistor 103; other bidirectional circuits may also be used instead).

When a single VCO 101 is used, voltage control is utilized to vary the frequency thereof, as discussed above. In coupled VCO array 250, once the two or more VCOs 101 are injection locked to each other, the voltage control inputs (e.g., control inputs 306 shown in FIG. 3) to the two or more VCOs 101 may still be utilized to vary the frequency of coupled VCO array 250 provided that the voltage control inputs have the same voltage levels and are varied in the same manner. If the voltage levels are different, the phase of the signals generated by the individual VCOs 101 may be separated. The aforementioned phase separation between the LO signals generated by the individual VCOs in coupled VCO array 250 may be utilized to perform beamforming when the phase-separated LO signals (e.g., LO signals 102) are mixed (e.g., through mixers 111) with transmit or receive signals to or from antenna array 106. The outputs of mixers 111 may be combined at a combiner 112 (e.g., a combiner circuit).

FIG. 1 also shows beamformer 150; said beamformer 150 is shown as including a switch matrix 113 and combiner 112; switch matrix 113 may be understood to be circuitry associated with routing signals (e.g., RF signals) between multiple inputs and outputs; combiner 112, obviously, may combine the multiple outputs of switch matrix 113. Here, the outputs of phase shifters 104 may serve as the multiple inputs to switch matrix 113.

Figure 3:
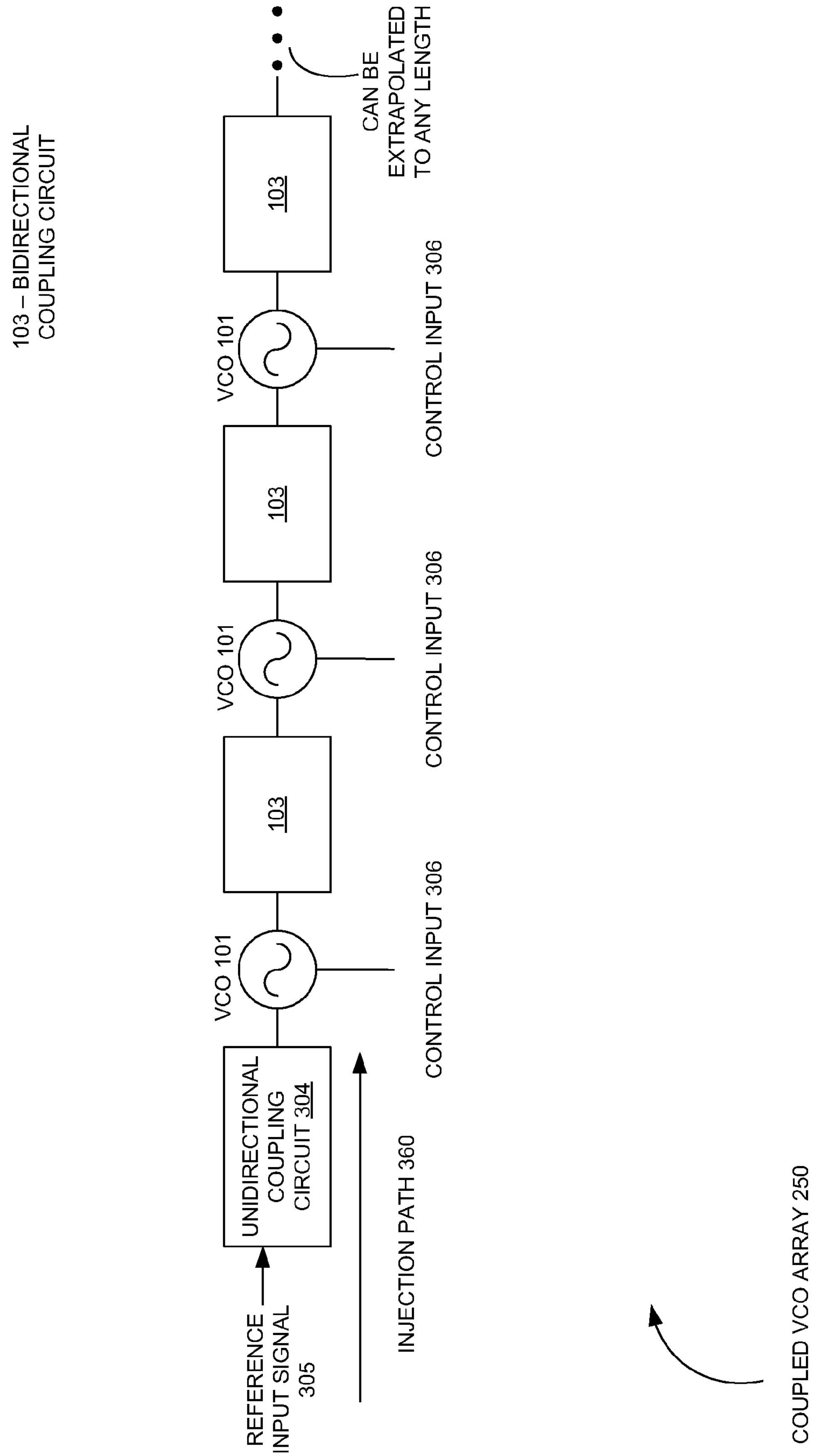
FIG. 3 is a schematic view of a coupled Voltage Controlled Oscillator (VCO) array of the LO scanned beamforming system of FIG. 2.

In FIG. 2, voltage control inputs of coupled VCO array 250 may be utilized exclusively for achieving phase separation between VCOs 101. Therefore, the voltage control inputs may be no longer available to be used for controlling the operating frequency of coupled VCO array 250. As the aforementioned operating frequency control is essential to a beamforming system, a separate reference signal may be injected into coupled VCO array 250. FIG. 3 shows coupled VCO array 250 with a reference input signal 305 thereto (e.g., shown as being coupled to VCOs 101 through unidirectional coupling circuit 304). The frequency control of reference input signal 305 may be accomplished through a system independent of coupled VCO array 250. The mechanism for injecting reference input signal 305 may also be based on injection locking. Thus, VCOs 101 of FIG. 3 may not only be mutually injection locked to each other, but also injection locked to reference input signal 305. As discussed above, control inputs 306 may be utilized to vary the frequency of coupled VCO array 250.

Coupled VCO array 250 may only generate differential phase shifts up to a certain level. Beyond this level, mutual injection locking may break down, and phase differences between VCOs 101 may be indeterminable. Thus, the range of possible LO phase differences generated through coupled VCO array 250 may be limited.

It will be appreciated that concepts disclosed herein may also be applied to two-dimensional or three-dimensional arrays of VCOs 101, in addition to one-dimensional arrays thereof. Conventional implementations of coupled VCO array 250 may involve single-ended circuitry (or, single-ended connections between circuitry). The simplicity factor of single-ended circuitry may be offset by susceptibility thereof to noise and interface. Further, coupled VCO array 250 may be employed in systems where noise and spurs have to be kept to an absolute minimum during detection of radio energy of small magnitude and/or during transmission of radio energy in a crowded spectrum.

Figure 4:
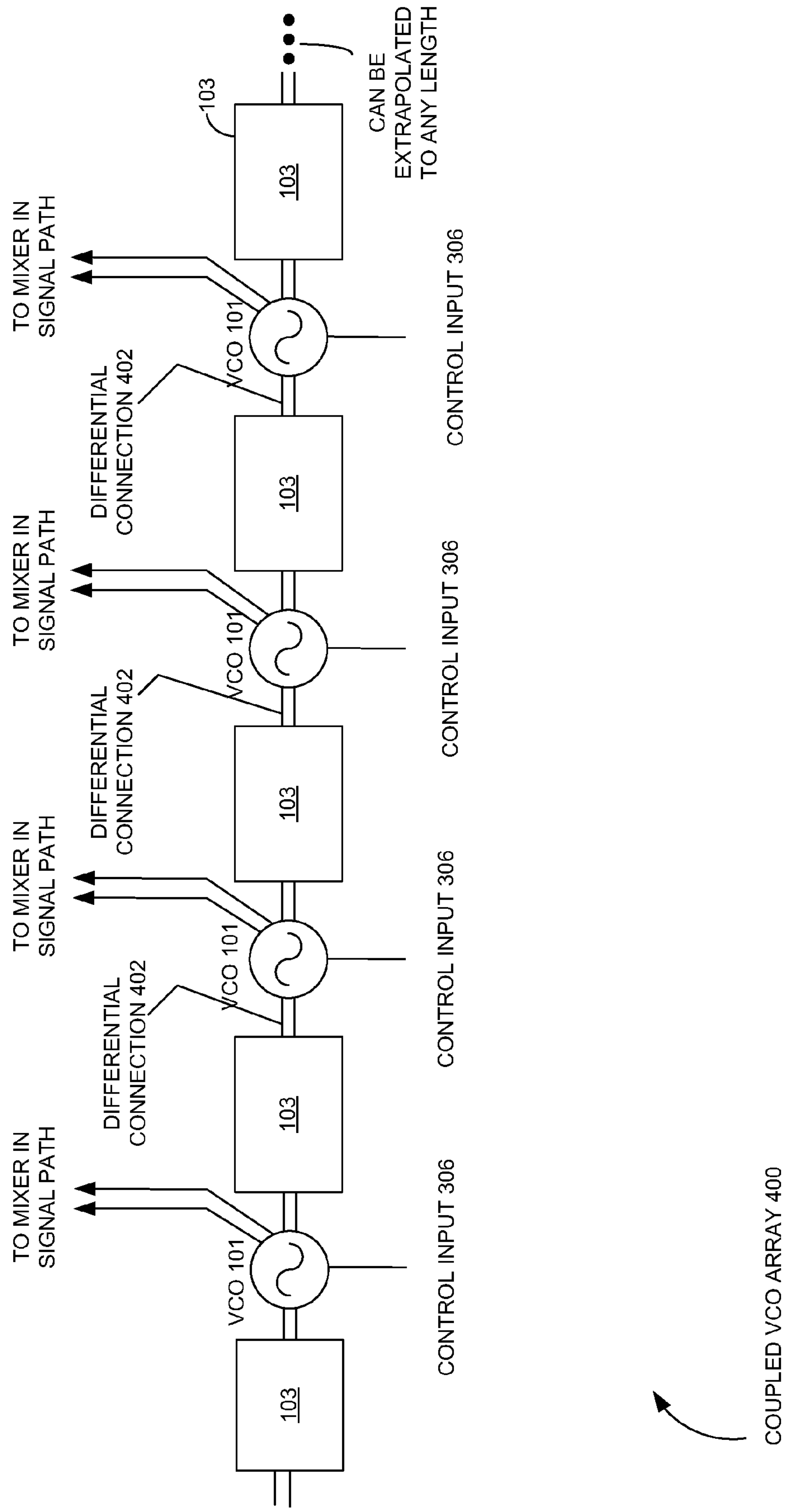
FIG. 4 is a schematic view of accommodation of differential coupling between VCOs in a coupled VCO array, according to one or more embodiments.

FIG. 4 shows a coupled VCO array 400 implemented using differential circuitry, according to one or more embodiments; FIG. 4 shows differential connections 402 therein; it should be noted that differential connections 402 may necessitate accommodating differential inputs and outputs through VCOs 101 and bidirectional coupling circuits 103 of coupled VCO array 400. In one or more embodiments, utilizing differential circuitry may allow for easy implementation of phase inversion circuitry in coupled VCO array 400. While implementing phase inversion circuitry in a single-ended system may be complex, costly and compromising with regard to other performance factors, implementing phase inversion with differential circuitry may be easy.

In one or more embodiments, phase inversion circuitry, when implemented in the paths coupling VCOs 101 and/or the injection path(s) (e.g., injection path 360 of FIG. 3) of reference input signal 305, may improve the phase difference range of coupled VCO array 400. In addition, in one or more embodiments, a phase-steering requirement of coupled VCO array 400 may be reduced through the implementation of the phase inversion circuitry.

Figure 5:
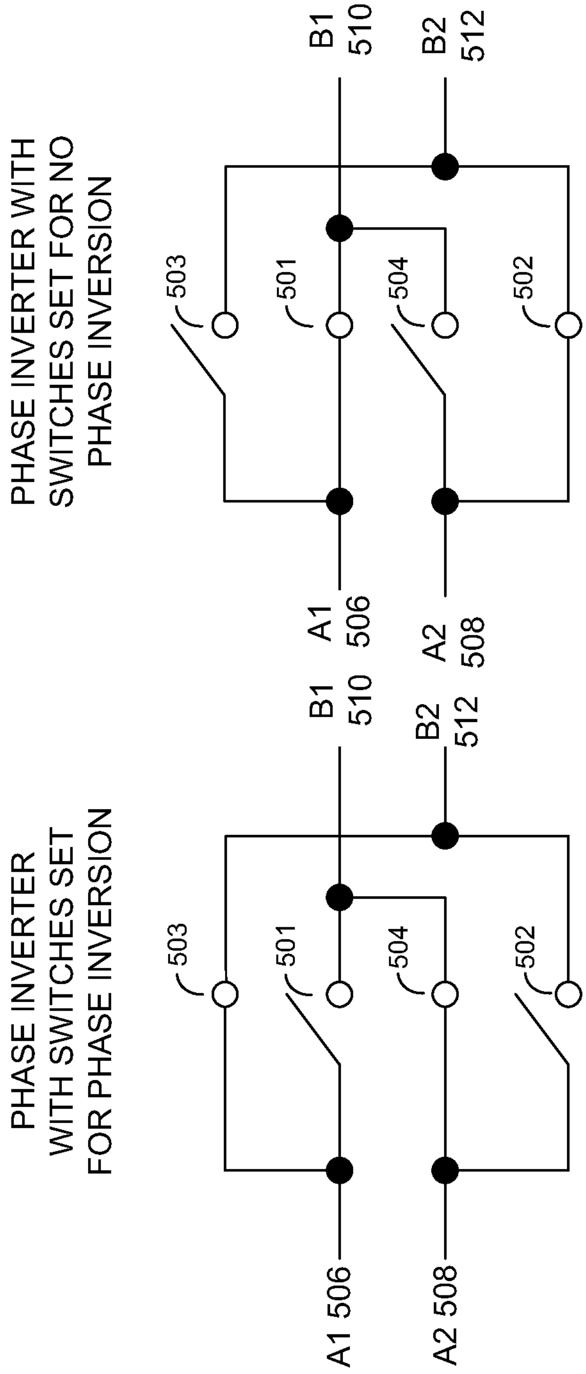
FIG. 5 is a schematic view of implementation of phase inversion in the coupled VCO array of FIG. 4, according to one or more embodiments.

FIG. 5 shows implementation of phase inversion in coupled VCO array 400 through the utilization of switches 501-504 in conjunction with differential signals, according to one or more embodiments. FIG. 5 also shows differential signals A1 506 and A2 508 and B1 510 and B2 512, with paths therebetween modified based on whether phase inversion is desired or not. In one or more embodiments, when phase inversion is desired, switches 503 and 504 may be closed (and switches 501 and 502 may be opened) such that A1 506 is coupled to B2 512 and A2 508 is coupled to B1 510. In one or more embodiments, when phase inversion is not desired, switches 501 and 502 may be closed (and switches 503 and 504 may be opened) such that A1 506 is coupled to B1 510 and A2 508 is coupled to B2 512. Circuitry implementing switches (501, 502, 503, 504) are known to one skilled in the art. Therefore, detailed description associated therewith has been skipped for the sake of clarity and brevity.

Thus, exemplary embodiments discussed above may provide for increased immunity to noise and interference. Further, exemplary embodiments may provide for increased beam-forming angles at the antenna array, thereby resulting in better performance and more flexibility. Coupled VCO array 400 may be implemented with other architectures and/or include other elements to additionally realize benefits therefrom.

It should be noted that a length of coupled VCO array 400 (e.g., a number of VCOs 101 therein) may be extrapolated as shown in FIG. 4 based on a requirement of the beamforming discussed above. Still further, it should be noted that a combined output of mixers 111 in FIG. 2 may be input to a channel of a wireless receiver incorporating the beamforming discussed above.

Figure 6:
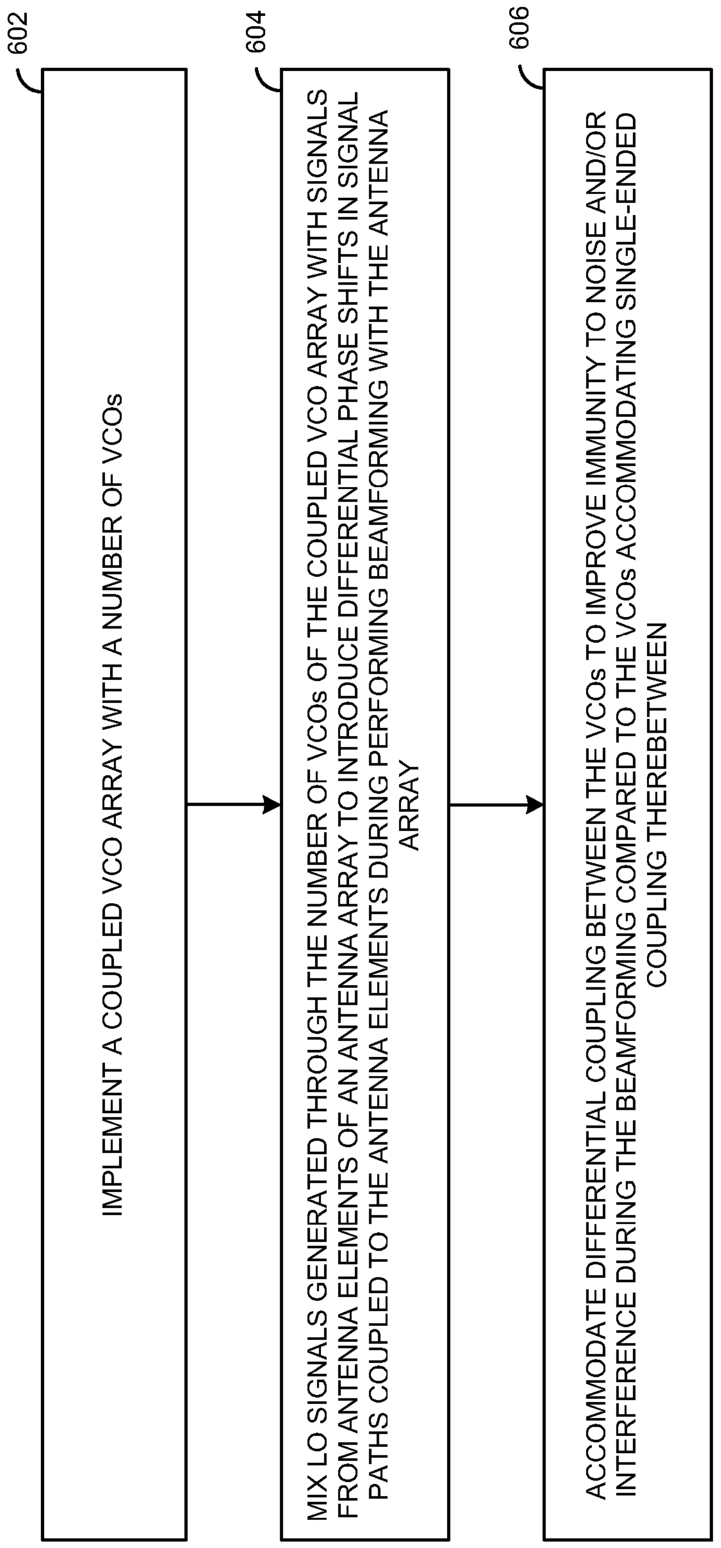
FIG. 6 is a process flow diagram detailing operations involved in extending beamforming capability of the coupled VCO array of FIG. 4 during LO signal generation through accommodating differential coupling between VCOs thereof, according to one or more embodiments.

FIG. 6 shows a process flow diagram detailing operations involved in extending beamforming capability of coupled VCO array 400 during LO signal generation through accommodating differential coupling between VCOs 101 thereof, according to one or more embodiments. In one or more embodiments, operation 602 may involve implementing coupled VCO array 400 with a number of VCOs 101. In one or more embodiments, operation 604 may involve mixing LO signals (e.g., LO signals 102) generated through the number of VCOs 101 of coupled VCO array 400 with signals from antenna elements of antenna array 106 to introduce differential phase shifts in signal paths coupled to the antenna elements during performing beamforming with antenna array 106. In one or more embodiments, operation 606 may then involve accommodating differential coupling between the VCOs 101 to improve immunity to noise and/or interference during the beamforming compared to the VCOs 101 accommodating single-ended coupling therebetween.

Although the present embodiments have been described with reference to specific example embodiments, it will be evident that various modifications and changes may be made to these embodiments without departing from the broader spirit and scope of the various embodiments. Accordingly, the specification and drawings are to be regarded in an illustrative rather than a restrictive sense.

What is claimed is:

1. A method comprising:

implementing a coupled Voltage Controlled Oscillator (VCO) array with a plurality of VCOs;

mixing Local Oscillator (LO) signals generated through the plurality of VCOs of the coupled VCO array with signals from antenna elements of an antenna array to introduce differential phase shifts in signal paths coupled to the antenna elements during performing beamforming with the antenna array;

accommodating differential coupling between the VCOs to achieve an improved immunity to at least one of: noise and interference during the beamforming, wherein the improved immunity is better than an immunity of the VCOs accommodating single-ended coupling instead of the differential coupling therebetween;

injection locking two or more VCOs of the coupled VCO array to each other; and coupling a VCO of the coupled VCO array to another VCO thereof through a differential bidirectional coupling circuit.

2. The method of claim 1, further comprising implementing differential phase inversion circuitry at least one of: between the VCOs and in a path of injection of a reference input signal into the coupled VCO array to increase a range of phase difference provided therethrough, the reference input signal being configured to control operating frequency of the coupled VCO array.

3. The method of claim 2, comprising implementing the differential phase inversion circuitry with a plurality of switches, a phase inversion provided through the differential phase inversion circuitry being accomplished based on a position of switches of the plurality of switches.

4. The method of claim 1, comprising providing one of: a one-dimensional, a two-dimensional and a three-dimensional VCO array as the coupled VCO array.

5. The method of claim 1, further comprising at least one of:

combining outputs of the mixing at a combiner circuit as part of the beamforming; and expanding a number of the coupled VCO array based on a requirement of the beamforming.

6. A beamforming system comprising:

a coupled VCO array comprising a plurality of VCOs coupled to one another;

an antenna array comprising a plurality of antenna elements; and a plurality of mixers, each of which is configured to mix an LO signal generated through a VCO of the coupled VCO array with a signal from an antenna element of the antenna array to introduce differential phase shifts in signal paths coupled to the antenna elements during performing beamforming with the antenna array, wherein the VCOs are configured to accommodate differential coupling therebetween to achieve an improved immunity to at least one of: noise and interference during the beamforming, wherein the improved immunity is better than an immunity of the VCOs accommodating single-ended coupling instead of the differential coupling therebetween, and wherein at least one of:

the beamforming system further comprises a combiner circuit to combine outputs of the plurality of mixers as part of the beamforming, and a number of the coupled VCO array is configured to be expanded based on a requirement of the beamforming.

7. The beamforming system of claim 6, further comprising differential phase inversion circuitry implemented at least one of: between the VCOs and in a path of injection of a reference input signal into the coupled VCO array to increase a range of phase difference provided therethrough, the reference input signal being configured to control operating frequency of the coupled VCO array.

8. The beamforming system of claim 7, wherein the differential phase inversion circuitry is implemented with a plurality of switches, a phase inversion provided through the differential phase inversion circuitry being accomplished based on a position of switches of the plurality of switches.

9. The beamforming system of claim 6, wherein two or more VCOs of the coupled VCO array are injected locked to each other.

10. The beamforming system of claim 9, further comprising a differential bidirectional coupling circuit to couple a VCO of the coupled VCO array to another VCO thereof.

11. The beamforming system of claim 6, wherein the coupled VCO array is one of: a one-dimensional, a two-dimensional and a three-dimensional VCO array.

12. A wireless communication system comprising:

a beamforming system comprising:

a coupled VCO array comprising a plurality of VCOs coupled to one another, an antenna array comprising a plurality of antenna elements, and a plurality of mixers, each of which is configured to mix an LO signal generated through a VCO of the coupled VCO array with a signal from an antenna element of the antenna array to introduce differential phase shifts in signal paths coupled to the antenna elements during performing beamforming with the antenna array, the VCOs being configured to accommodate differential coupling therebetween to achieve an improved immunity to at least one of: noise and interference during the beamforming, wherein the improved immunity is better than an immunity of the VCOs accommodating single-ended coupling instead of the differential coupling therebetween; and a receiver channel configured to receive a combined output of the plurality of mixers of the beamforming system, wherein two or more VCOs of the coupled VCO array of the beamforming system are injected locked to each other, and wherein the beamforming system further comprises a differential bidirectional coupling circuit to couple a VCO of the coupled VCO array to another VCO thereof.

13. The wireless communication system of claim 12, wherein the beamforming system further comprises differential phase inversion circuitry implemented at least one of: between the VCOs and in a path of injection of a reference input signal into the coupled VCO array to increase a range of phase difference provided therethrough, the reference input signal being configured to control operating frequency of the coupled VCO array.

14. The wireless communication system of claim 13, wherein the differential phase inversion circuitry of the beamforming system is implemented with a plurality of switches, a phase inversion provided through the differential phase inversion circuitry being accomplished based on a position of switches of the plurality of switches.

15. The wireless communication system of claim 12, wherein the coupled VCO array of the beamforming system is one of: a one-dimensional, a two-dimensional and a three-dimensional VCO array.

* * * * *